US010616438B2

United States Patent
Kurosawa (10) Patent No.: US 10,616,438 B2
(45) Date of Patent: Apr. 7, 2020

(54) IMAGE READING APPARATUS, IMAGE FORMING APPARATUS AND IMAGE READING METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Norio Kurosawa, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 105 days.

(21) Appl. No.: 15/712,554

(22) Filed: Sep. 22, 2017

(65) Prior Publication Data

US 2019/0098164 A1    Mar. 28, 2019

(51) Int. Cl.
*H04N 1/04* (2006.01)
*H04N 1/00* (2006.01)
*H04N 1/12* (2006.01)

(52) U.S. Cl.
CPC ......... *H04N 1/0443* (2013.01); *H04N 1/0057* (2013.01); *H04N 1/122* (2013.01); *H04N 2201/04701* (2013.01); *H04N 2201/04753* (2013.01)

(58) Field of Classification Search
CPC .... H04N 1/0443; H04N 1/0057; H04N 1/122; H04N 2201/04701
See application file for complete search history.

(56) References Cited

U.S. PATENT DOCUMENTS

| | | | |
|---|---|---|---|
| 7,628,400 B2 | 12/2009 | Ishikawa | |
| 2010/0220344 A1* | 9/2010 | Tashiro | H04N 1/40056 358/1.13 |
| 2011/0292469 A1* | 12/2011 | Takahashi | H04N 1/031 358/474 |

FOREIGN PATENT DOCUMENTS

JP         03-110063 A    11/1991

* cited by examiner

*Primary Examiner* — Cheukfan Lee
(74) *Attorney, Agent, or Firm* — Amin, Turocy & Watson, LLP (57) ABSTRACT

In accordance with an embodiment, an image reading apparatus comprises a conveyance system, a reading section, a movement sensor and a processor. The conveyance system conveys a document in a conveyance route including a reading position. The reading section reads an image on a surface of the document passing through the reading position. The movement sensor detects a conveyance speed of the document conveyed by the conveyance system. In a case in which the conveyance speed of the document detected by the movement sensor differs from a reference speed, if the conveyance speed of the document is within an adjustable range, the processor performs control to adjust a reading processing in response to the conveyance speed of the document.

6 Claims, 4 Drawing Sheets

IMAGE READING APPARATUS, IMAGE FORMING APPARATUS AND IMAGE READING METHOD

FIELD

Embodiments described herein relate generally to an image reading apparatus, an image forming apparatus and an image reading method.

BACKGROUND

There is an image reading apparatus having a function of reading an image on a document conveyed by a document feeder (DF). The conventional image reading apparatus determines a conveyance condition of the document by the document feeder at an ON/OFF timing of a sensor arranged on a conveyance path to detect presence or absence of the document. The image forming apparatus has a conveyance mechanism for conveying a sheet as an image receiving medium on which an image is formed. The conventional image forming apparatus determines a conveyance condition of the sheet at an ON/OFF timing of a sensor arranged on the conveyance path to detect presence or absence of the sheet. However, the sensor for detecting the presence or absence of the document or the sheet cannot detect movement of the document or the sheet. For this reason, there is problem that the conventional image reading apparatus and image forming apparatus are difficult to perform control according to an actual movement of the document or the sheet.

DETAILED DESCRIPTION

In accordance with an embodiment, an image reading apparatus comprises a conveyance system, a reading section, a movement sensor and a processor. The conveyance system conveys a document in a conveyance route including a reading position. The reading section reads an image on a surface of the document passing through the reading position. The movement sensor detects a conveyance speed of the document conveyed by the conveyance system. In a case in which the conveyance speed of the document detected by the movement sensor differs from a reference speed, if the conveyance speed of the document is within an adjustable range, the processor performs control to adjust a reading processing in response to the conveyance speed of the document.

Hereinafter, an embodiment is described with reference to the accompanying drawings.

Figure 1:
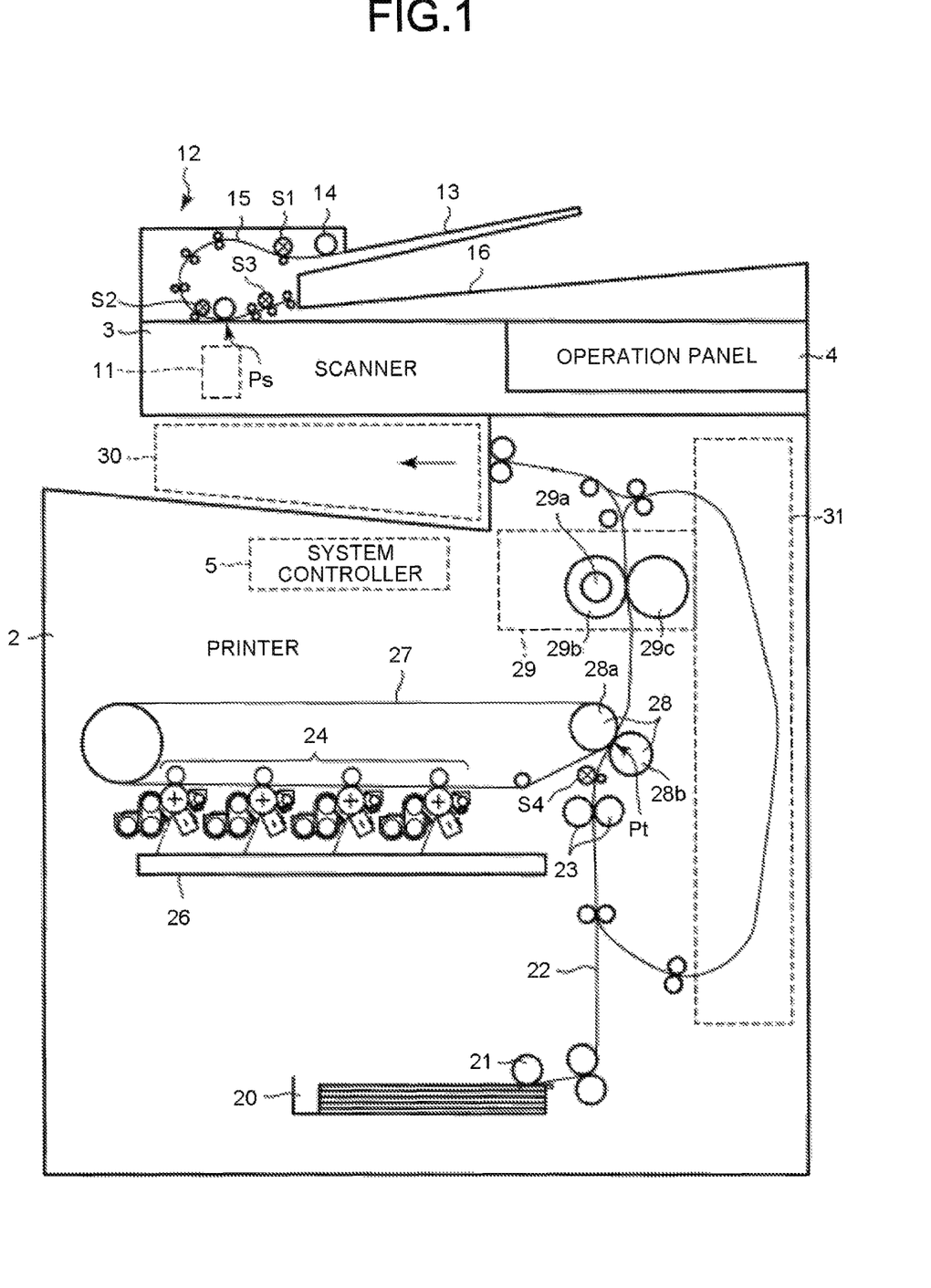
FIG. 1 is a cross-sectional view s of an image forming apparatus.

FIG. 1 is a diagram schematically exemplifying the constitution of a digital multifunctional peripheral as an image reading apparatus and an image forming apparatus according to the embodiment.

As shown in FIG. 1, a digital multifunctional peripheral (MFP) 1 according to the present embodiment includes a printer 2, a scanner 3, an operation panel 4, and a system controller 5.

First, an example of the constitution of the scanner 3 as the image reading apparatus is described.

The scanner 3 is the image reading apparatus which reads an image of a document to convert it to image data. In the example of the constitution shown in FIG. 1, the scanner 3 is arranged at the upper part of a main body of the digital multifunctional peripheral. The scanner 3 has an automatic document feeder (ADF) 12.

The scanner 3 includes a reading section 11 for reading an image on the document and an ADF 12 for conveying the document. The reading section 11 includes lighting, a photoelectric conversion element, an optical system and the like. The lighting is constituted by an exposure lamp that illuminates the document with light. The photoelectric conversion element is constituted by a CCD sensor that converts the light from the surface of the document to the image data. The optical system directs the light from the surface of the document to the photoelectric conversion element.

In the scanner 3 according to the present embodiment, the reading section 11 has a function of reading the image on the document conveyed by the ADF 12 at a predetermined reading position Ps. The reading section 11 may have the function of moving along a document table glass and scanning the image on the surface of the document placed on the document table glass. In this case, the reading section 11 has a mechanism moving along the document table glass on which the document is placed to scan the entire surface of the document.

The ADF 12 conveys the documents set at a paper feed position one by one. The ADF 12 conveys the document in such a manner that the surface of the document passes through the reading position Ps. In the example of the constitution shown in FIG. 1, the ADF 12 has a stacking tray 13, a pickup roller 14, a conveyance system 15, and a sheet discharge tray 16.

On the stacking tray 13, one or more documents which are reading objects are stacked. The pickup roller 14 is provided above the stacking tray 13. In a case of picking up the document, the pickup roller 14 is driven in a state in contact with the uppermost document among the documents stacked on the stacking tray 13. The pickup roller 14 sends one document to a conveyance path formed by the conveyance system 15 by rotating in contact with the document on the stacking tray 13.

The conveyance system 15 is composed of a plurality of conveyance rollers and the like, and forms the conveyance path for conveying the document. The conveyance system 15 conveys the document supplied by the pickup roller 14. The conveyance system 15 conveys the document in such a manner that a reading surface of the document passes through the reading position Ps. The conveyance system 15 sends the document passing through the reading position Ps to the sheet discharge tray 16.

In the conveyance path formed by the conveyance system 15 in the ADF 12, plural movement sensors S (S1, S2 and S3) for detecting the movement of the document are arranged. The movement sensor S detects a speed (conveyance speed) of the document at each detection position. The movement sensor S may be any sensor as it can measure the speed of an object (the document or the sheet) conveyed in the conveyance path. For example, the movement sensor S is constituted by a rotary encoder or an optical motion sensor. The rotary encoder detects the speed of the object by rotation of a rotating body in contact with the object (the document). The optical motion sensor detects the speed of the object by the movement of an optically detected image. For example, the optical motion sensor detects a movement amount (speed) with respect to the object based on light emitted by a light emitting section and light received by a light receiving section.

FIG. 1 shows an example of the constitution of the movement sensor S (S1, S2, S3 and S4) for detecting the speed of the object (the document or the sheet) by using a rotating body (roller). The movement sensor S shown in FIG. 1 has a roller that contacts the object and a sensor that detects rotation of the roller. The roller of the movement sensor S shown in FIG. 1 is installed so as to be driven to rotate in accordance with a conveyance operation of the object in the conveyance path. The movement sensor S outputs a signal indicating the rotation of the roller measured by the sensor as information indicating the speed of the object. For example, the movement sensor S is arranged in such a manner that the roller contacts with the object at approximately center part in a vertical direction (width direction) with respect to a conveyance direction of the object in the conveyance path. According to such an arrangement, the roller of the movement sensor S abuts against the document or the sheet near the center in the width direction of the document or the sheet regardless of a size of the document or the sheet. The roller abuts against the object at the center in the width direction of the object, and thus, even if a load is applied to the object from the roller, the object can be prevented from skewing.

In the ADF 12 shown in FIG. 1, the movement sensors S1, S2 and S3 are placed near a pickup position of the document, the front of the reading position Ps, and near a sheet discharge position of the document. In the present embodiment, the movement sensor S is arranged in such a manner that the speed of the document conveyed in the ADF 12 can be detected continuously. For example, in the ADF 12, the plurality of the movement sensors S is arranged on the conveyance path at intervals according to a minimum size of the document that can be handled. One movement sensor S (S2) among the plurality of the movement sensors S is arranged at a position where the speed of the document passing through the reading position Ps can be detected.

Next, an example of the constitution of the printer 2 as the image forming apparatus is described.

The printer 2 shown in FIG. 1 is a printer of an image forming system in which an image formed on a photoconductive drum by an electrophotographic system is transferred onto an intermediate transfer body and then the image is transferred from the intermediate transfer body onto the sheet.

In the example of the constitution shown in FIG. 1, the printer 2 has a sheet feed cassette 20. For example, the sheet feed cassette 20 is provided in a detachable state at the lower part of the main body of the digital multifunctional peripheral. The sheet feed cassette 20 houses the sheet as an image receiving medium on which an image is formed.

The sheet feed cassette 20 has a pickup roller 21. The pickup roller 21 picks up the sheets one by one from the sheet feed cassette 20. The pickup roller 21 supplies the sheet taken out to a conveyance path formed by a conveyance system 22 composed of a plurality of conveyance rollers.

The number of the sheet feed cassettes and the pickup rollers as sheet feed sections are not limited to one. For example, the sheet feed section may have a plurality of sheet feed cassettes and a plurality of pickup rollers, or may have a manual feed tray.

The conveyance system 22 includes a resist roller 23 for adjusting the timing to supply a sheet to a transfer position (secondary transfer position) Pt for transferring an image onto the sheet. The conveyance system 22 conveys the sheet supplied by the pickup roller 21 to the resist roller 23. The resist roller 23 is driven in accordance with a timing given by a control system to send the sheet to the transfer position Pt. The movement sensor S (S4) is arranged in the conveyance path until the sheet sent out by the resist roller 23 reaches the transfer position Pt of the image.

The movement sensor S4 detects the speed of the sheet. The movement sensor S4 may have the same constitution as the movement sensors S1, S2 and S3 in the ADF 12 described above. The movement sensor S4 may be a rotary encoder or an optical motion sensor. In the present embodiment, it is assumed that the movement sensor S4 has a roller (rotating body) in contact with the object (the sheet) and a sensor for detecting the rotation of the roller. In the example of the constitution shown in FIG. 1, the movement sensor S4 is arranged at a position to detect the speed of the sheet passing through the transfer position (image transfer position) Pt.

An image forming section 24 uses an image forming material to form an image. The image forming section 24 may form a monochrome image or a color image. In the example shown in FIG. 1, it is assumed that the image forming section 24 forms an image using YMCK toner (yellow (Y) toner, magenta (M) toner, cyan (C) toner, and black (K) toner). In this case, the image forming section 24 has the photoconductive drum as an image carrier for the toner of each color (Y, M, C or K).

On each photoconductive drum of the image forming section 24, an electrostatic latent image is formed by laser light from an exposure section 26. The exposure section 26 irradiates the photoconductive drum with the laser light controlled by the system controller 5 via an optical system such as a polygon mirror. The image forming section 24 forms a toner image by developing the electrostatic latent image formed on each photoconductive drum with each toner of Y, M, C, and K. An intermediate transfer belt 27 is an intermediate transfer body. The image forming section 24 transfers (primarily transfers) the toner image formed on each photoconductive drum onto the intermediate transfer belt 27.

A transfer section 28 transfers the toner image on the intermediate transfer belt 27 onto the sheet at the secondary transfer position Pt as the image transfer position. The secondary transfer position Pt is a position at which the toner image on the intermediate transfer belt 27 is transferred onto the sheet. The secondary transfer position Pt is a position where a support roller 28a and a secondary transfer roller 28b face each other. The resist roller 23 conveys the sheet to the secondary transfer position Pt in accordance with a timing of the formation of the toner image on the intermediate transfer belt 27. The transfer section 28 supplies the sheet onto which the toner image is transferred at the secondary transfer position Pt to a fixing device 29.

The fixing device 29 fixes the toner image on the sheet. In the example of the constitution shown in FIG. 1, the fixing device 29 has a heat roller 29b arranged with a heating section 29a and a pressure roller 29c in contact with the heat roller 29b in a pressurized state. The heating section 29a may be, for example, a heater lamp such as a halogen lamp or an induction heating (IH) type heater. The heating section 29a may be composed of a plurality of heaters. The heating section 29a heats the heat roller 29b to a fixing temperature. The fixing device 29 heats the sheet, onto which the toner image is transferred by the transfer section 28, at the fixing temperature while pressurizing the sheet. In this way, the fixing device 29 fixes the toner image on the sheet.

The sheet to which the fixing device 29 executes a fixing processing is conveyed to either a sheet discharge section 30 or an automatic two-sided device 31 by the conveyance mechanism. For example, in a case of forming an image on a back surface of the sheet subjected to the fixing processing, the conveyance mechanism conveys the sheet to an ADU 31 by switching the sheet back after the sheet is temporarily conveyed to the sheet discharge section 30 side. The ADU 31 again supplies the sheet in a state in which front and back surfaces thereof are reversed by switchback to the front of the resist roller 23. If the sheet subjected to the fixing processing by the fixing device 29 is discharged, the conveyance system 22 conveys the sheet to the sheet discharge section 30 side to discharge it to the sheet discharge section 30.

Incidentally, the image forming apparatus to which the present embodiment can be applied is not limited to the printer of an electrophotographic system having the intermediate transfer body. For example, the image forming apparatus to which the present embodiment is applied may be a printer in which an image is transferred from the photoconductive drum onto the sheet without the intermediate transfer body. In this case, the movement sensor is arranged to detect the conveyance speed of the sheet at a position (image transfer position) where the image is transferred from the photoconductive drum onto the sheet.

Further, the image forming apparatus to which the present embodiment is applied may be an ink jet type or a thermal transfer type printer. In this case, the movement sensor is arranged to detect the conveyance speed of the sheet at a position (image forming position) where the image is formed on the sheet.

Next, the operation panel 4 is described.

The operation panel 4 is a user interface. The operation panel 4 is controlled by the system controller 5. The operation panel 4 outputs information input by a user to the system controller 5. The user designates an operation mode and inputs information such as setting information through the operation panel 4.

Next, the constitution of the control system of the digital multifunctional peripheral is described.

Figure 2:
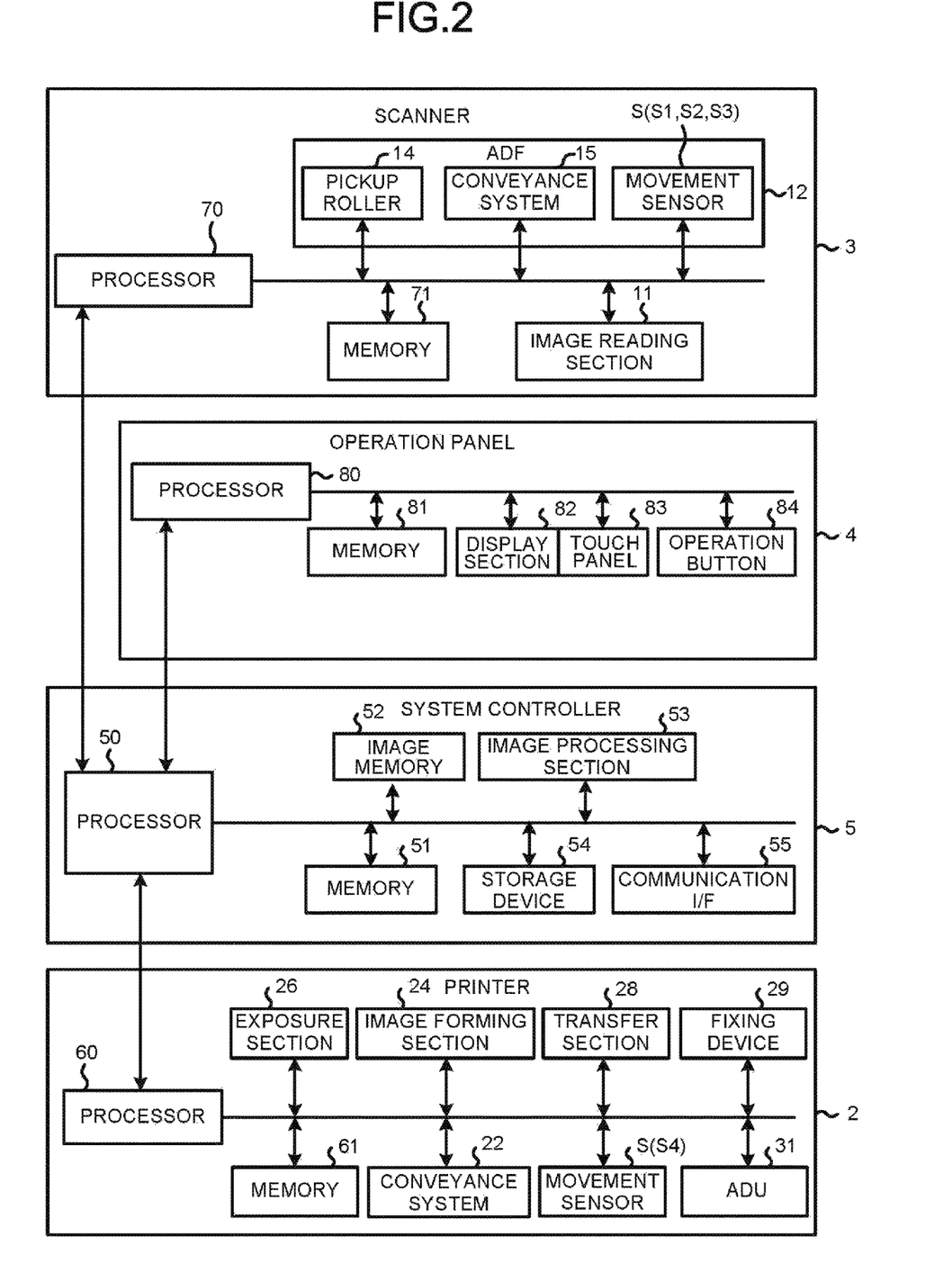
FIG. 2 is a block diagram of a control system in the image forming apparatus.

FIG. 2 is a block diagram schematically exemplifying the constitution of the control system in each section of the digital multifunctional peripheral.

In the example of the constitution shown in FIG. 2, the system controller 5 includes a processor 50, a memory 51, an image memory 52, an image processing section 53, a storage device 54, and a communication interface (I/F) 55.

The processor 50 is connected with a processor of the scanner 3, a processor of the printer 2 and a processor of the control panel 4 via interfaces. The processor 50 realizes various processing functions by executing programs stored in the memory 51 or the storage device 54. For example, by executing a program stored in the memory 51, the processor 50 outputs an operation instruction to each section and acquires various information from each section.

The memory 51 includes memories such as a RAM (Random Access Memory), a ROM (Read Only Memory), a data memory and the like. The RAM functions as a working memory or a buffer memory. The ROM is a non-rewritable nonvolatile memory. The ROM functions as a program memory. The data memory is a rewritable nonvolatile memory.

The image memory 52 stores image data. For example, the image memory 52 functions as a page memory for developing the image data which is a processing object. The image processing section 53 processes the image data. For example, the image processing section 53 corrects, compresses, or decompresses the image data.

The storage device 54 stores control data, control programs, setting information and the like. The storage device 54 is composed of, for example, a rewritable nonvolatile memory.

The communication I/F 55 is used for performing data communication with an external device. For example, the communication I/F 55 functions as an image acquisition section that acquires an image to be printed on the sheet from an external device such as a PC. The communication I/F 55 also functions as an interface for communicating with a server described later.

An example of the constitution of the control system in the printer 2 is described below.

As shown in FIG. 2, the printer 2 includes a processor 60, a memory 61, the conveyance system 22, the movement sensor S (S4), the image forming section 24, the exposure section 26, the transfer section 28, the fixing device 29, and the inversion section (ADU) 31.

The processor 60 realizes various processing by executing programs stored in the memory 61. For example, the processor 60 executes a program to control the operation of each section in the printer 2 and monitor an operation condition of each section. The processor 60 is connected to the processor 50 of the system controller 5 via an interface. The processor 60 executes a printing processing in response to an operation instruction from the system controller 5.

The memory 61 includes memories such as a RAM (Random Access Memory), a ROM (Read Only Memory), a data memory and the like. The RAM functions as a working memory or a buffer memory. The ROM is a non-rewritable nonvolatile memory. The ROM functions as a program memory. The data memory is a rewritable nonvolatile memory.

The conveyance system 22 drives the conveyance rollers provided in each section in the printer 2 in response to the operation instruction from the processor 60. The exposure section 26 emits the laser light for forming the electrostatic latent image on each photoconductive drum of the image forming section 24 in response to the operation instruction from the processor 60. The image forming section 24 develops the electrostatic latent image formed on the photoconductive drum with the toner of each color in response to the operation instruction from the processor 60.

The movement sensor S (S4) detects the conveyance speed of the sheet at the position where the image is transferred (or formed) onto the sheet. In the example of the constitution shown in FIG. 1, the processor 60 performs control according to the conveyance speed of the sheet detected by the movement sensor S4. For example, the processor 60 detects a speed at which the sheet passes through the transfer position Pt with the movement sensor S4. In this case, the processor 60 adjusts the speed at which the image is transferred (formed) according to the conveyance speed of the sheet detected by the movement sensor S.

The transfer section 28 transfers the toner image transferred onto the intermediate transfer belt 27 onto the sheet in response to the operation instruction from the processor 60. The fixing device 29 drives the heat roller 29b and the pressure roller 29*c* in response to the operation instruction from the processor 60. The heating section 29*a* of the fixing device 29 heats the surface temperature of the heat roller 29*b* to the desired fixing temperature under the control of the processor 60. The fixing device 29 fixes the toner image transferred onto the sheet on the sheet while the fixing device 29 is controlled to the fixing temperature. The inversion section (ADU) 31 reverses the front and back surfaces of the sheet passing through the fixing device 29 to supply it again in response to the operation instruction from the processor 60.

Next, an example of the constitution of the control system in the scanner 3 is described.

As shown in FIG. 2, the scanner 3 has a processor 70, a memory 71, the reading section 11, a pickup roller 14, the conveyance system 15, and the movement sensors S (S1, S2 and S3).

The processor 70 realizes various processing by executing programs stored in the memory 71. For example, by executing a program, the processor 70 controls the operation of each section in the scanner 3 and monitors an operation condition of each section. The processor 70 is connected to the processor 50 of the system controller 5 via an interface. The processor 70 executes a scanning processing in response to the operation instruction from the system controller 5.

The memory 71 includes memories such as a RAM (Random Access Memory), a ROM (Read Only Memory), a data memory and the like. The RAM functions as a working memory or a buffer memory. The ROM is a non-rewritable nonvolatile memory. The ROM functions as a program memory. The data memory is a rewritable nonvolatile memory. For example, the memory 71 may store the speed of the document at the time of passing through the reading position Ps in the ADF 12.

The reading section 11 reads the image on the surface of the document conveyed by the ADF 12 at the reading position Ps. The reading section 11 may read the image on the document on the document table glass. The reading section 11 reads the image of the entire document by moving the reading position along the document table glass at a predetermined speed in a case of reading the image on the document on the document table glass.

As the constitution of the control system, the ADF 12 includes the pickup roller 14, the conveyance system 15 and the movement sensors S (S1, S2 and S3). The processor 70 drives the pickup roller 14 and the conveyance system 15 to convey the documents one by one to the reading position Ps. The processor 70 performs control according to the conveyance speed of the document detected by the movement sensors S (S1, S2 and S3). For example, the processor 70 detects the conveyance speed of the document passing through the reading position Ps with the movement sensor S2. In this case, the processor 70 adjusts the reading speed of the image according to the conveyance speed of the document detected by the movement sensor S2. The processor 70 detects conveyance abnormality such as jam of the document according to the conveyance speed of the document detected by the movement sensors S1, S2 and S3.

An example of the constitution of the control system in the operation panel 4 is described below.

As shown in FIG. 2, the operation panel 4 includes a processor 80, a memory 81, a display section 82, a touch panel 83, an operation button 84, and the like.

The processor 80 realizes various processing by executing programs stored in the memory 81. For example, by executing a program, the processor 80 controls the operation of each section of the operation panel 4 and monitors an operation condition of each section. The processor 80 is connected to the processor 50 of the system controller 5 via an interface. For example, the processor 80 notifies the system controller 5 of information input by the user.

The memory 81 includes memories such as a RAM (Random Access Memory), a ROM (Read Only Memory), a data memory and the like. The RAM functions as a working memory or a buffer memory. The ROM is a non-rewritable nonvolatile memory. The ROM functions as a program memory. The data memory is a rewritable nonvolatile memory.

A display content of the display section 82 is controlled in response to the operation instruction from the processor 80. The touch panel 83 is provided on a display screen of the display section 82 to detect a touched position on the display screen. For example, the processor 80 displays an icon selectable with the touch panel 83 together with an operation guidance on the display section 82. The processor 80 determines the information input by the user according to the touch position detected by the touch panel 83. The operation button 84 includes hard keys such as a start key, a reset key, or the like.

A processing in which the scanner 3 as the image reading apparatus reads the image on the document using the ADF 12 is described below.

Figure 3:
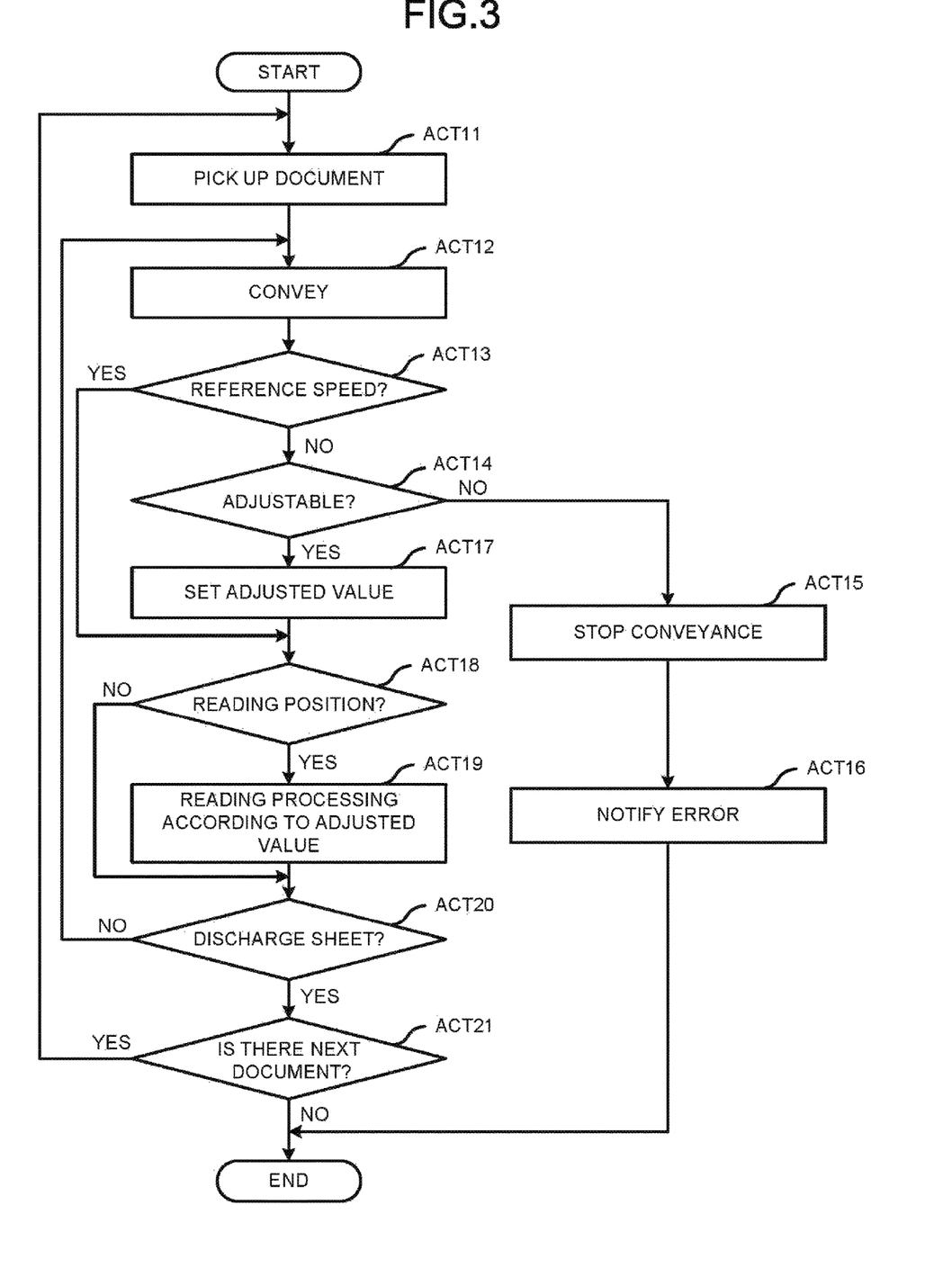
FIG. 3 is a flowchart of a reading processing on a document using an ADF.

FIG. 3 is a flowchart illustrating the reading processing of the document using the ADF 12 by the scanner 3.

In a case of reading the image on the document using the ADF 12, the user places the document on the stacking tray 13, and then inputs a document reading instruction through the operation panel 4. The processor 80 of the operation panel 4 receives input of the document reading instruction input by the operation button 84 or the touch panel 83. The processor 80 of the operation panel 4 notifies the processor 50 of the system controller 5 that the document reading instruction is input.

In a case of receiving the notification indicating that the document reading instruction is input from the operation panel 4, the processor 50 of the system controller 5 instructs the scanner 3 to read the document. The processor 70 of the scanner 3 starts the reading processing of the document in response to the instruction from the system controller 5. Here, it is assumed that the processor 70 of the scanner 3 starts reading the document stacked on the stacking tray 13 using the ADF 12.

The processor 70 drives the pickup roller 14 to pick up one document from the stacking tray 13 (ACT 11). The processor 70 conveys the document picked up by the pickup roller 14 by the conveyance system 15 (ACT 12). In conveyance of the document, the processor 70 monitors a conveyance state of the sheet by the movement sensors S installed at various places in the conveyance path of the ADF 12. The processor 70 acquires information indicating the speed (conveyance speed) of the document from each movement sensor S.

If the information indicating the conveyance speed of the document is received from the movement sensor S, the processor 70 determines whether the conveyance speed of the document is a reference speed (ACT 13). The reference speed is s preset conveyance speed of the document in the ADF 12. The determination on whether the conveyance speed is the reference speed may allow errors within a range not affecting the reading of the document by the reading section 11. If the conveyance speed of the document detected by the movement sensor S is the reference speed (Yes in ACT 13), the processor 70 proceeds to the processing in ACT 18.

If the conveyance speed of the document detected by the movement sensors S is not the reference speed (No in ACT 13), the processor 70 determines whether the conveyance speed of the document is within an adjustable range (ACT 14). The adjustable range indicates a range of the conveyance speed at which the document can be normally read by an adjustment control described later. For example, the adjustable range may be any range as long as a conveyance interval with a document to be conveyed next can be ensured at an interval of a predetermined value or more.

If it is determined that the conveyance speed of the document is not within the adjustable range (No in ACT 14), the processor 70 stops the conveyance system 15 to stop conveying the document (ACT 15). If the conveyance of the document by the ADF 12 is stopped, the processor 70 notifies an error by displaying a conveyance abnormality on the display section 82 (ACT 16).

In the ADF 12, the movement sensors S are arranged in the conveyance path to be capable of continuously detecting the movement (speed) of the document as well as the presence or absence of the document. As a result, if the conveyance speed of the document becomes an abnormal value, the conveyance system 15 can be stopped immediately, and the damage to the document due to a conveyance abnormality such as a jam can be reduced as much as possible.

If it is determined that the conveyance speed of the document is within the adjustable range (Yes in ACT 14), the processor 70 sets an adjusted value according to the conveyance speed of the document (ACT 17). The adjusted value is a value for carrying out the adjustment control according to the conveyance speed of the document based on the reference speed. For example, the processor 70 sets the adjusted value according to a difference between the conveyance speed of the document and the reference speed. If the conveyance speed of the document detected by the movement sensor S is slower than the reference speed, the processor 70 performs control according to the adjusted value to normally read the image on the document at an actual conveyance speed.

If the document reaches the reading position Ps (Yes in ACT 18), the processor 70 reads the image on the document by the adjustment control according to the current adjusted value (conveyance speed of the document) (ACT 19). For example, the processor 70 controls a timing (reading cycle) to acquire the image data from the photoelectric conversion element of the reading section 11 according to the adjusted value as the adjustment control. In a case in which the conveyance speed of the document is 99% of the reference speed, if the reading cycle is set to 99%, the image data equivalent to that in a case in which the conveyance speed of the document is 100% can be acquired.

The processor 70 may execute an image processing according to the adjusted value as the adjustment control. For example, the processor 70 stores the conveyance speed of the document at the time of passing through the reading position Ps in the memory 71 for each position of the document. The processor 70 corrects the image data read by the reading section 11 according to the conveyance speed stored in the memory 71 after the reading of the image on the document by the reading section 11 is completed. In other words, the processor 70 may stretch or shrink the image data read by the reading section 11 in the conveyance direction depending on the conveyance speed detected by the movement sensor. Thus, even if the conveyance speed of the document is different from the reference speed, the image data equivalent to a read image of the document conveyed at the reference speed can be obtained.

Until the document is discharged (No in ACT 20), the processor 70 sets the adjusted value according to the conveyance speed of the document. While the document is at the reading position Ps (Yes in ACT 18), the processor 70 reads the image on the document by a reading control in response to the adjusted value.

If the document is discharged (Yes in ACT 20), the processor 70 ends the reading processing on the document and checks whether the next document exists on the stacking tray 13 (ACT 21). If there is the next document, the processor 70 returns to the processing in ACT 11 to perform the processing in the same way as described above on the next document. If there is no next document on the stacking tray 13 (No in ACT 21), the processor 70 ends the reading processing on the document using the ADF 12.

As described above, the scanner according to the embodiment can detect the actual conveyance speed of the document in the ADF with the movement sensor. The scanner according to the embodiment can immediately stop conveying the document and reduce the damage to the document as much as possible if the conveyance speed of the document exceeds the adjustable range. The scanner according to the embodiment, if the conveyance speed of the document deviates from the reference speed (design value) but within the adjustable range, continues the conveyance of the document and executes the reading processing of the document accompanying the adjustment control. The adjustment control is control for acquiring an image equivalent to the read image of the document conveyed at the reference speed in response to the adjusted value based on the conveyance speed of the document with respect to the reference speed. As the adjustment control, the scanner performs the image processing according to adjustment of the image reading cycle or the conveyance speed of the document. With such an adjustment control, the scanner according to the embodiment can continue the reading processing even if the conveyance speed of the document fluctuates (decreases), and can acquire a normal read image.

If the conveyance speed of the document decreases, the scanner may notify the decrease of the conveyance speed of the document while continuing the reading processing of the document accompanying the adjustment control according to the adjusted value. Thus, it is easy to early find trouble (for example, reduction in the conveyance speed due to wear of conveyance rollers etc.) of the conveyance system while continuously carrying out the reading processing on the document. Furthermore, the scanner may notify an external device (such as a server) of the decrease of the conveyance speed of the document via the system controller. Thus, it is possible for an administrator to grasp the decrease in the conveyance speed of the document in the ADF.

The conveyance control of the sheet in the image forming processing by the printer 2 as the image forming apparatus is described below.

Figure 4:
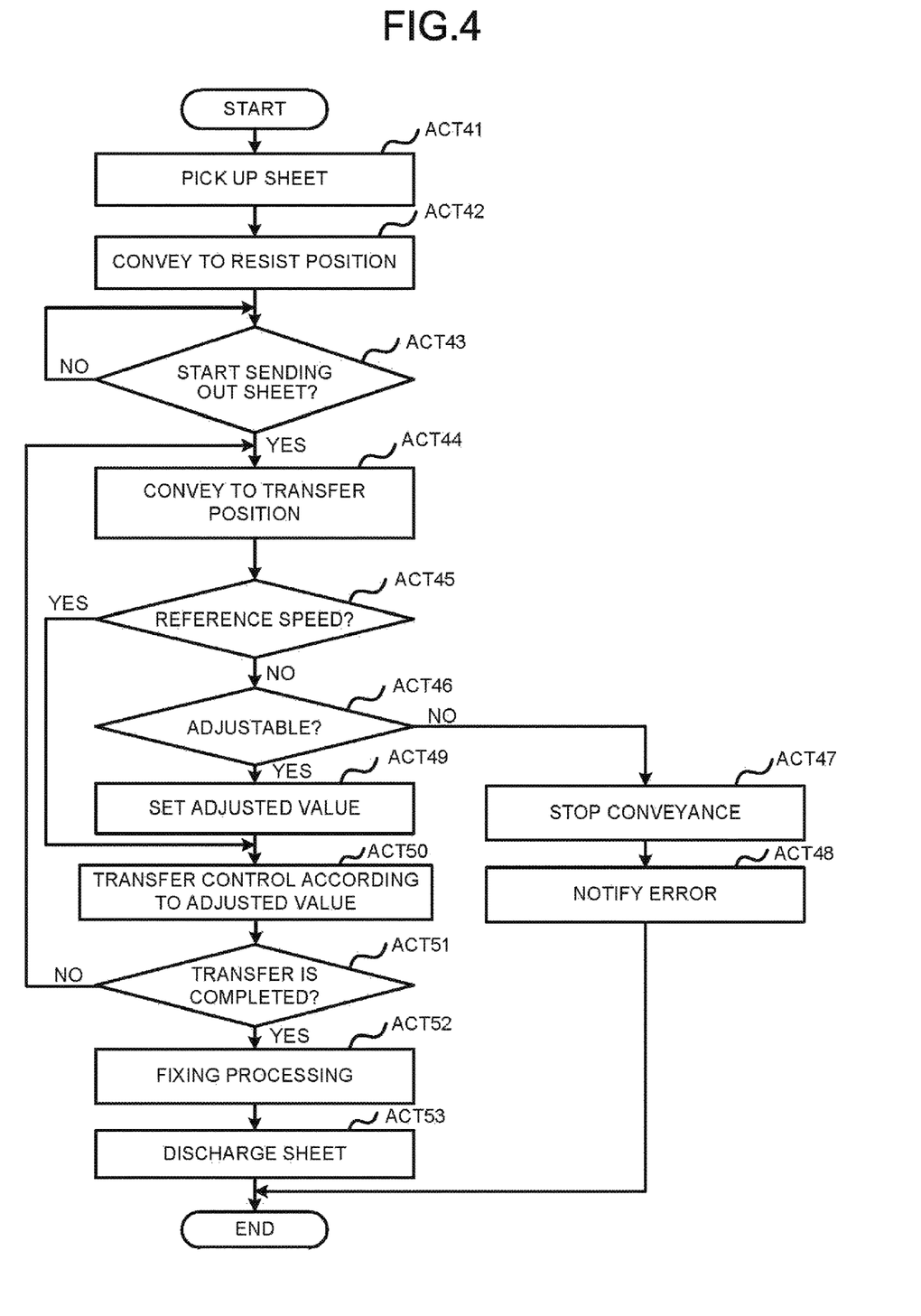
FIG. 4 is a flowchart of a sheet conveyance control in the image forming apparatus.

FIG. 4 is a flowchart illustrating the flow of the sheet conveyance control in the image forming processing by the printer 2.

The printer 2 executes the image forming processing of printing an image for printing requested by the system controller 5 on the sheet. For example, in a copying processing, the system controller 5 supplies a print request and an image read by the scanner 3 to the printer 2 as the image for printing. In a network printing processing, the system controller 5 supplies an image received from a terminal device such as a user PC or the like via the communication I/F 55 to the printer 2 as the image for printing.

The processor 60 of the printer 2 starts a printing processing in response to the print request from the system controller 5. In a case of receiving the print request from the system controller 5, the processor 60 of the printer 2 executes a sheet feeding processing of the sheet. The processor 60 drives the pickup roller 21 to pick up one sheet from the sheet feed cassette 20 (ACT 41). The processor 60 conveys the sheet picked up by the pickup roller 21 with the conveyance system 22 to the front (resist position) of the resist roller 23 (ACT 42).

If the sheet is conveyed to the resist position, the processor 60 determines the timing to supply the sheet to the transfer position Pt (ACT 43). In parallel with the control of conveying the sheet to the resist position, the processor 60 executes a processing of forming an image transferred onto the sheet. In other words, the processor 60 forms an image of each color on the photoconductive drum of each color with the image forming section 24 and the exposure section 26. The processor 60 superimposes images formed on the photoconductive drums of respective colors and transfers (primarily transfers) them onto the intermediate transfer belt 27. The processor 60 moves the images transferred onto the intermediate transfer belt 27 to the transfer position Pt. The processor 60 determines the timing to feed the sheet from the resist position in accordance with the timing at which the images on the intermediate transfer belt 27 are transferred onto the transfer position Pt.

At the timing to supply the sheet to the transfer position Pt (Yes in ACT 43), the processor 60 drives the resist roller 23 to convey the sheet to the transfer position Pt (ACT 44). If the sheet is sent out by the resist roller 23, the processor 60 detects the conveyance speed of the sheet according to the detection signal from the movement sensor S4. The processor 60 determines whether the conveyance speed of the sheet detected by the movement sensor S4 is the reference speed (ACT 45). The reference speed for conveying the sheet is the design value of the conveyance speed of the sheet in a case of transferring an image onto the sheet. The determination on whether the conveyance speed of the sheet is the reference speed may allow an error within a range not affecting the transfer of the image at the transfer position Pt. If the conveyance speed of the sheet detected by the movement sensor S4 is the reference speed (Yes in ACT 45), the processor 60 proceeds to the processing in ACT 50.

If it is determined that the conveyance speed of the sheet is not the reference speed (No in ACT 45), the processor 60 determines whether the conveyance speed of the sheet is within the adjustable range (ACT 46). Here, the adjustable range indicates the range of the conveyance speed at which the normal image transfer can be executed by the adjustment control described later. For example, the adjustable range may be any range as long as a conveyance interval with a sheet to be conveyed next can be ensured at an interval of a predetermined value or more.

If it is determined that the conveyance speed of the sheet is not within the adjustable range (No in ACT 46), the processor 60 stops conveying the sheet with the conveyance system 22 (ACT 47). If the conveyance of the sheet is stopped, the processor 60 notifies a conveyance error of the sheet by displaying a conveyance abnormality or the like on the display section 82 (ACT 48). The movement sensor S4 is arranged to be capable of detecting not only the presence or absence of the sheet but also the movement (speed) of the sheet passing through the transfer position. As a result, if the conveyance speed of the sheet becomes an abnormal value, the conveyance system 22 can be stopped immediately and the damage to the sheet due to a conveyance abnormality such as a jam can be reduced.

If it is determined that the conveyance speed of the sheet is within the adjustable range (Yes in ACT 46), the processor 60 sets the adjusted value according to the conveyance speed of the sheet (ACT 49). The adjusted value is a value for performing control according to a fluctuation range (decrease) of the conveyance speed of the sheet with respect to the reference speed. For example, the processor 60 sets the adjusted value according to the difference between the conveyance speed of the sheet and the reference speed.

The processor 60 controls the image transfer onto the sheet at the transfer position Pt by the adjustment control according to the current adjusted value (conveyance speed of the sheet) (ACT 50). For example, the processor 60 controls the image transfer onto the sheet by adjusting a travel speed of the intermediate transfer belt according to the adjusted value as the adjustment control. While the sheet is at the transfer position Pt (No in ACT 51), the processor 60 performs the setting of the adjusted value according to the conveyance speed of the document and transfer control according to the adjusted value.

If the sheet passes through the transfer position Pt (Yes in ACT 51), the processor 60 conveys the sheet onto which the image is transferred to the fixing device 29 to execute the fixing processing (ACT 52). Upon completion of the fixing processing on the sheet, the processor 60 discharges the sheet on which the image is transferred and fixed to the sheet discharge section 30 (ACT 53).

As described above, the printer according to the embodiment can detect the conveyance speed of the sheet passing through the transfer position with the movement sensor arranged in front of the transfer position. The printer can immediately stop the conveyance system and reduce damage to the sheet and apparatus if the conveyance speed of the sheet passing through the transfer position is beyond the adjustment range. If the conveyance speed of the sheet fluctuates from the reference speed (design value) but within the adjustable range, the printer continues to convey the sheet and continues the image forming processing accompanying the adjustment control. As the adjustment control, the printer performs the transfer control of the image onto the sheet according to the adjusted value based on the conveyance speed of the sheet. Thus, in the printer according to the present embodiment, even if the conveyance speed of the sheet fluctuates, the image forming processing can be continued and a normal image can be transferred onto the sheet.

Although the operation example described above is an example of operation in the printer of the electrophotographic system, the adjustment control in accordance with the conveyance speed of the sheet detected by the movement sensor can be performed with printers of other types. For example, in an inkjet type printer, the conveyance speed of the sheet at a position (image forming position) where the ink is sprayed on the sheet may be detected. In this case, the inkjet type printer adjusts the timing (image forming timing) at which the ink is sprayed on the sheet at the image forming position according to the conveyance speed of the sheet. Thus, it is possible to form a normal image on the sheet according to the conveyance speed of the sheet.

Furthermore, the printer informs the reduction in the conveyance speed of the sheet even if the conveyance speed is within the adjustable range in a case in which the conveyance speed of the sheet passing through the transfer position (the image forming position) of the image decreases. As a result, it is easy to early find the trouble of the conveyance system (for example, a decrease in the conveyance speed due to wear of the conveyance roller) while continuously executing the image forming processing. Further, the printer may notify an external device (such as a server or the like) of the decrease in the conveyance speed of the sheet via the system controller. Thus, it is possible for the administrator to grasp the decrease in the conveyance speed of the sheet in the printer.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image reading apparatus, comprising:
   a movement sensor device; and
   a processor configured to:
   convey a document in a conveyance route including a reading position;
   read an image on the document passing through the reading position;
   wherein the movement sensor device is configured to detect a conveyance speed of the document conveyed along the conveyance route; and
   wherein the processor is configured to adjust a reading processing in response to the conveyance speed of the document if the conveyance speed of the document detected by the movement sensor device differs from a reference speed, and wherein the processor adjusts a timing at which the image is read at the reading position based on the conveyance speed of the document and an adjustment in the reading processing.

2. The image reading apparatus according to claim 1, further comprising:
   a memory configured to store the conveyance speed of the document detected by the movement sensor device, wherein
   the processor acquires image data obtained by processing image data at the reading position according to the conveyance speed of the document stored in the memory.

3. The image reading apparatus according to claim 1, wherein
   the processor stops conveying the document if the conveyance speed of the document detected by the movement sensor device is beyond the adjustable range.

4. The image reading apparatus according to claim 1, wherein
   the movement sensor device is installed close to and at an upstream side of the reading position in the conveyance route.

5. The image reading apparatus according to claim 1, wherein
   the movement sensor device is installed at a plurality of positions to continuously detect a speed of the document in the conveyance route.

6. An image reading method, including:
   conveying a document in a conveyance route including a reading position;
   reading an image on a surface of the document passing through the reading position;
   detecting a conveyance speed of the document conveyed in the conveyance route by a movement sensor device; and
   adjusting a reading processing in response to the conveyance speed of the document if the conveyance speed of the document detected by the movement sensor device differs from a reference speed, and adjusting a timing at which the image is read at the reading position based on the conveyance speed of the document and an adjustment in the reading processing.

* * * * *